(12) United States Patent
Kraus et al.

(10) Patent No.: US 7,891,043 B2
(45) Date of Patent: Feb. 22, 2011

(54) WINSHIELD WIPING DEVICE

(75) Inventors: Achim Kraus, Buehl (DE); Juergen Rapp, Lauf (DE)

(73) Assignee: Robert Bosch GmbH, Stuttgart (DE)

( * ) Notice: Subject to any disclaimer, the term of this patent is extended or adjusted under 35 U.S.C. 154(b) by 1192 days.

(21) Appl. No.: 10/588,677

(22) PCT Filed: Jan. 27, 2005

(86) PCT No.: PCT/EP2005/050352

§ 371 (c)(1),
(2), (4) Date: Aug. 8, 2006

(87) PCT Pub. No.: WO2005/080158

PCT Pub. Date: Sep. 1, 2005

(65) Prior Publication Data

US 2008/0313839 A1    Dec. 25, 2008

(30) Foreign Application Priority Data

Feb. 20, 2004    (DE) ........................ 10 2004 008 333

(51) Int. Cl.
*B60S 1/04* (2006.01)

(52) U.S. Cl. ................ 15/250.31; 15/250.3; 296/96.17; 296/96.15; 403/2; 403/DIG. 3

(58) Field of Classification Search ............ 15/250.31, 15/250.3, 250.34; 296/96.15, 96.17; 403/DIG. 3, 403/2

See application file for complete search history.

(56) References Cited

U.S. PATENT DOCUMENTS

| 6,901,623 | B2 * | 6/2005 | Ohashi et al. ............ 15/250.31 |
| 2003/0077013 | A1 * | 4/2003 | Zimmer ...................... 384/415 |

FOREIGN PATENT DOCUMENTS

| EP | 0 739 792 | 10/1996 |
| EP | 0 852 195 | 7/1998 |
| EP | 1 103 434 | 5/2001 |
| EP | 1 122 137 | 8/2001 |
| EP | 1 219 513 | 7/2002 |
| FR | 2 840 270 | 12/2003 |
| JP | 62161081 | 10/1987 |

\* cited by examiner

*Primary Examiner*—Gary K Graham
(74) *Attorney, Agent, or Firm*—Michael Best & Friedrich LLP

(57) ABSTRACT

Disclosed is a windshield wiper device (10), comprising a wiper bearing (16) which is essentially composed of a molded tube (18) that can be fastened to a motor vehicle by means of a fastening element (20). A wiper shaft (22) to which a wiper lever can be fastened is positioned in the molded tube (18). A predetermined breaking point (32) is provided on the fastening element (20) in such a way that the wiper bearing (16) is able to dip into the interior of the motor vehicle in case a defined and essentially axial force acts on the wiper shaft (22). The predetermined breaking point (32) is embodied as a hole in this case.

10 Claims, 2 Drawing Sheets

WINSHIELD WIPING DEVICE

BACKGROUND OF THE INVENTION

The invention relates to a windshield wiper device.

Numerous windshield wiper devices are known, which have a wiper bearing with a molded tube and a wiper shaft positioned therein, on which a wiper lever can be fastened. These wiper bearings have a fastening element, which is embodied as a one-part piece with the molded tube and is used to fasten the windshield wiper device to the motor vehicle.

This type of windshield wiper device is known from EP-A-0 739 792 in particular. The wiper bearings supporting the wiper shaft have a fastening element there, which is provided with a predetermined breaking point so that the wiper bearing can dip into the interior of the motor vehicle in the case of an impact of a pedestrian on the wiper shaft. The predetermined breaking points are embodied in this case as constrictions of the cross section of the fastening element. The embodiments shown there are expensive in terms of manufacturing, wherein in addition the force that is required to break the determined breaking point can only be adjusted in an imprecise manner.

SUMMARY OF THE INVENTION

The advantage of the windshield wiper device is that the embodiment of the predetermined breaking point as a hole makes it possible to adjust in a much more precise manner the force necessary to separate the wiper bearing from the body of the vehicle. In this way, the impact behavior, i.e., the behavior of the windshield wiper device during an impact of a pedestrian on the wiper shaft, can also be adjusted in vehicle-specific way. In addition, this embodiment is cost-effective and particularly practical for series production since the wiper bearings can be fabricated in large unit numbers and then the predetermined breaking points can be introduced in the fastening element individually for each vehicle type.

It is particularly advantageous if the fastening element is embodied as a plate-like projection and is embodied as a one-part piece with the molded tube. As a result, the wiper bearing is simple and cost-effective to manufacture, e.g., in a diecasting method. This makes it unnecessary to use hinges, rivets, dowels or other fastening agents between the fastening element and the molded tube, which can be prone to interference in operation or could be damaged in the case of a pedestrian impact.

In another advantageous embodiment, the fastening element has at least one hole with a circular or oval cross section since holes can be made in the fastening element simply, easily and cost-effectively, whereby the defined impact force can be adjusted easily by the number and size of the holes.

In addition, it is viewed as advantageous if at least one hole has a rectangular cross section. This is easy to mill into the fastening element and very low impact forces can also be adjusted.

The breaking behavior of the fastening element is further improved, if at least one hole runs, with respect to its longitudinal axis, in the plane of the fastening element.

It is also advantageous if at least one hole runs, with respect to its longitudinal axis, perpendicular to the plane of the fastening element since these types of holes can be made perpendicularly in the plate-shaped fastening element by simple bores.

In an especially cost-effective embodiment, the wiper bearing is embodied at least partially of plastic, which is easier to process than other materials. Fiber reinforced plastic is advantageous above all in this case.

One embodiment made of diecast is also advantageous for the wiper bearing since large wiper bearings, like those that are required for large vehicles with long wiper levers, can be realized in this way.

It is also advantageous for the predetermined breaking point (32) to be arranged between the fastening point (34) of the fastening section (20) and the molded tube (18).

BRIEF DESCRIPTION OF THE DRAWINGS

Various exemplary embodiments of the invention are depicted in the drawings and explained in greater detail in the following description. The drawings show.

DETAILED DESCRIPTION

Figure 1:
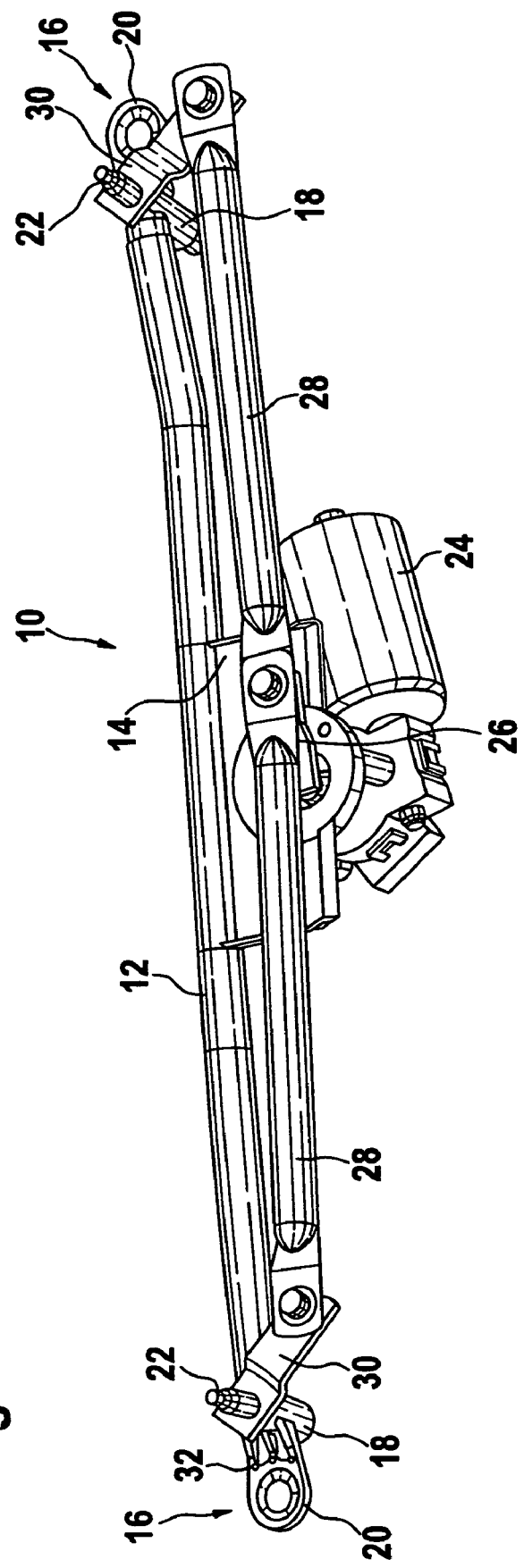
FIG. 1 A perspective representation of a windshield wiper device in accordance with the invention.

FIG. 1 shows a perspective representation of a windshield wiper device 10 in accordance with the invention.

It is comprised essentially of a support tube 12 with a support mounting plate 14, which is embodied of sheet metal. Fastened on each end of support tube 12 is a wiper bearing 16, which has a molded tube 18 and a fastening element 20, which is used to fasten the windshield wiper device 10 to the motor vehicle.

Positioned in the molded tube 18 is the wiper shaft 22, which can be connected to wiper levers that are not shown here. In operation, these wiper levers move in a pendulum fashion over the window of the motor vehicle.

For this purpose, a drive 24 is fastened to the mounting plate 14, which has an output crank 26 to which the two thrust rods 28 are linked. The free ends of the thrust rods 28 are connected in a rotatably disposed manner to driving cranks 30, which are in turn each connected to a wiper shaft 22 in a rotationally secured manner. If the driving crank 26 now executes a back-and-forth movement or a rotating circular movement, the thrust rods 28 and therefore the driving cranks 30 are also put into a back-and-forth motion. As a result, the wiper shafts 22 rotate back and forth so that the wiper levers move over the window in a pendulum fashion.

If a pedestrian now impacts the wiper shafts 22 during an accident, a large axial force acts on the molded tube 18 of the wiper bearing 16. In order to avoid injuries to the pedestrian, it is desirable for the windshield wiper device 10 to break out of its fastening. The wiper shafts 22 can then dip into the interior of the motor vehicle, thereby diminishing the risk of injury to the pedestrian. Predetermined breaking points 32 are provided for this purpose, which are embodied as holes in the fastening element 20.

Figure 2:
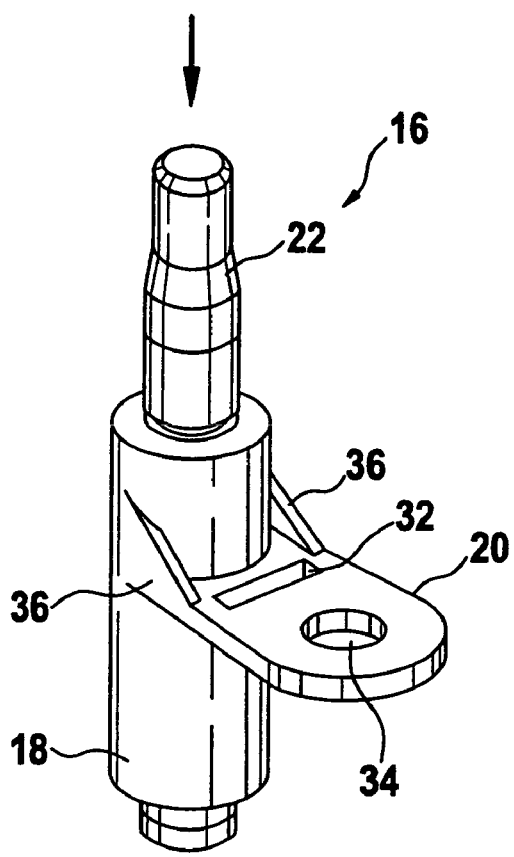
FIG. 2 A perspective representation of a wiper bearing of a windshield wiper device in accordance with the invention.

FIG. 2 shows a schematic, perspective representation of wiper bearing 16 of a windshield wiper device 10 in accordance with the invention. The wiper bearing 16 comprises essentially the molded tube 18, which has an essentially hollow cylindrical design and which positions the wiper shaft 22. The fastening element 20 is embodied as a one-part piece with the molded tube 18 and the fastening element extends radially to the outside as a plate-shaped projection. In this case, the axis arranged perpendicular to the plate plane of the projection is approximately parallel to the axis of the wiper shaft 22. Depending upon the geometry of the windshield wiper device 10, the plane of the fastening element 20 can naturally also be provided in an angular manner.

The fastening element 20 also has an opening 34, through which a fastening means, e.g., a screw, a rivet bolt or a guide pin can be inserted to fasten the windshield wiper device 10 to the motor vehicle so that the opening 34 serves as a fastening point for the windshield wiper device 10.

Arranged between the molded tube 18 and the free end of the fastening element 20, or more precisely between the molded tube 18 and the opening 34 of the fastening element 20, is the rectangular predetermined breaking point 32, whose longitudinal extension is perpendicular to the connecting line between the opening 34 and the molded tube 18. In a variation, the predetermined breaking point 32 can naturally also be arranged at another location, for example parallel to the connecting line between the opening 34 and molded tube 18. The rectangular predetermined breaking point 32 penetrates the entire depth of the plate-like projection of the fastening element 20. In a variation, it can also be designed to be tub-like, however, so that a bridge remains as the base.

Figure 3:
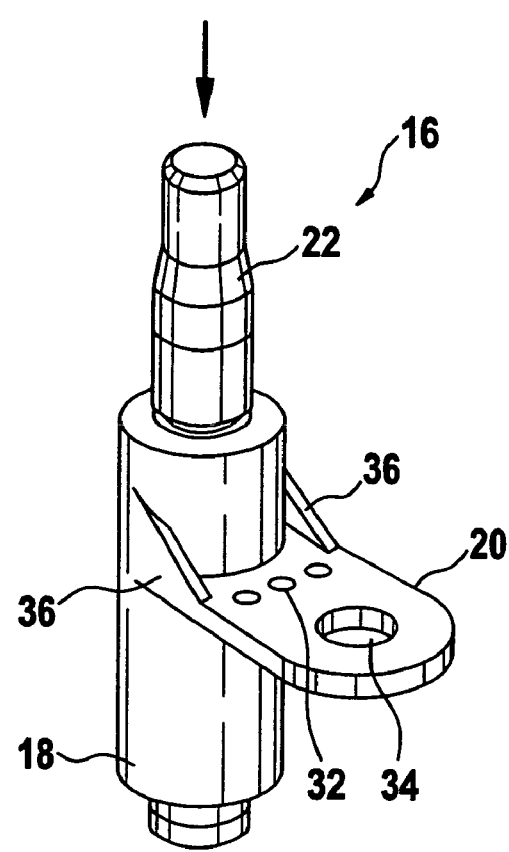
FIG. 3 A variation of a wiper bearing from FIG. 2.

FIG. 3 depicts a variation of the wiper bearing from FIG. 2. The wiper bearing 16 is embodied to be identical to FIG. 2, however, the predetermined breaking point 32 is embodied in this case in another manner. Three bore holes are provided, which extend perpendicular to the plate of the plate-like fastening element 20. In addition to the three bore holes shown here, naturally only two or only one bore hole(s) can be provided, and four, five or six bore holes are also conceivable, possible and meaningful. The bore holes 32 do not absolutely have to be designed to be circular, an oval design is also possible here. The bore holes 32 can be arranged radially around the molded tube 18 or even on a straight line that is arranged perpendicular to the connecting line between the opening 34 and the wiper shaft 22. The bore holes 32 can also be arranged on this connecting line between the opening 34 and the wiper shaft 22.

Figure 4:
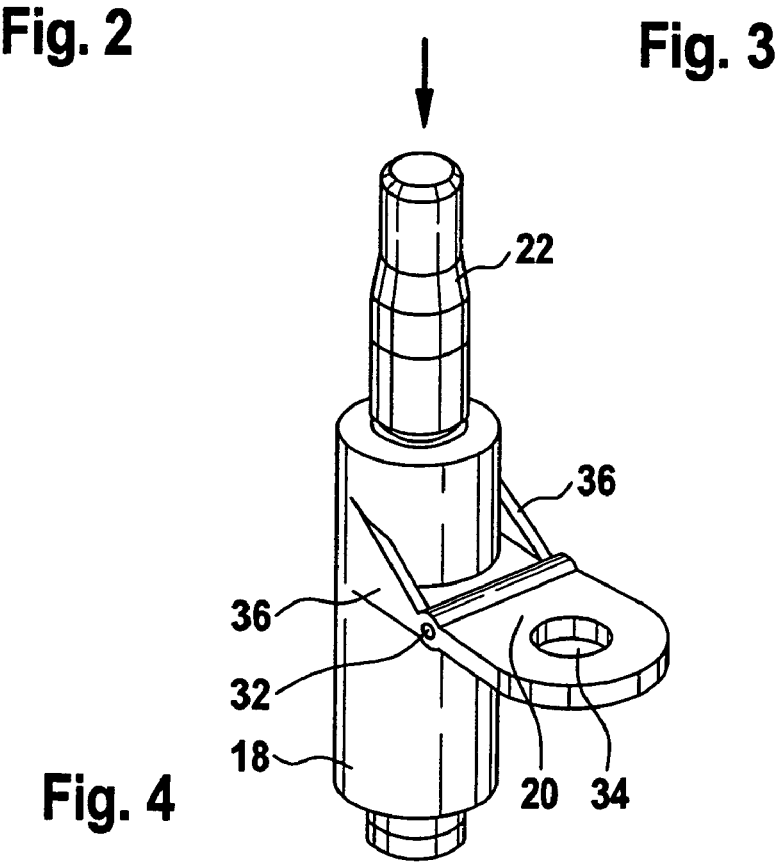
FIG. 4 Another variation of a wiper bearing from FIG. 2.

FIG. 4 shows another variation of a wiper bearing in accordance with the invention. In this case, a bore hole is provided as a predetermined breaking point 32, whose longitudinal extension runs in the plane of the plate-like fastening element 20 between the opening 34 and the wiper shaft 22. The plate-like fastening element 20 is itself designed to be somewhat thicker in the area of the bore hole.

In all the embodiments, the predetermined breaking points 32 can be executed either directly during the diecasting process of the wiper bearing 16 or also be introduced separately after the casting.

In order to reinforce the plate-like fastening element 20, it is also connected to the molded tube 18 via reinforcing walls 36. The reinforcing walls 36 extend from the plane of the plate-like fastening element 20 vertically in the direction of the molded tube 18. The termination of the reinforcing walls 36 is in the plate-like fastening element 20, however, outside the area of the predetermined breaking points 32.

In a variation, the reinforcing walls 36 can also go beyond the predetermined breaking points 32, however, this must be taken into account in dimensioning the predetermined breaking points. In particular, the reinforcing walls 36 can also run circumferentially along the entire edge of the fastening element 20.

The invention claimed is:

1. Windshield wiper device (10) for a motor vehicle having an interior, comprising a wiper bearing (16), a wiper shaft (22) positioned in a molded tube (18) of the wiper bearing (16) on which a wiper lever can be fastened, and a fastening element (20), which is a one-part piece with the wiper bearing (16) and is used to fasten the windshield wiper device (10) to the motor vehicle, the fastening element (20) being a plate-like projection defining a plane, and the fastening element (20) having a predetermined breaking point (32) such that the wiper bearing (16) is able to dip into the interior of the motor vehicle in case a defined, essentially axial force acts on the wiper shaft (22), characterized in that the predetermined breaking point (32) includes a hole having a longitudinal axis in the plane of the fastening element (20).

2. Windshield wiper device (10) according to claim 1, characterized in that the fastening element (20) is a one-part piece with the molded tube (18).

3. Windshield wiper device (10) according to claim 1, characterized in that the hole has a circular cross section.

4. Windshield wiper device (10) according to claim 1, characterized in that the wiper bearing (16) is embodied at least partially of plastic.

5. Windshield wiper device (10) according to claim 1, characterized in that the wiper bearing (16) is embodied at least partially of diecast.

6. Windshield wiper device (10) according to claim 1, characterized in that the predetermined breaking point (32) is arranged between a fastening point (34) of the fastening element (20) and the molded tube (18).

7. Windshield wiper device (10) according to claim 1, characterized in that the hole has a circular cross section.

8. Windshield wiper device (10) according to claim 7, characterized in that the wiper bearing (16) is embodied at least partially of plastic.

9. Windshield wiper device (10) according to claim 7, characterized in that the wiper bearing (16) is embodied at least partially of diecast.

10. Windshield wiper device (10) according to claim 7, characterized in that the predetermined breaking point (32) is arranged between a fastening point (34) of the fastening element (20) and the molded tube (18).

* * * * *